(12) United States Patent
Moravapalle et al.

(10) Patent No.: US 10,652,756 B2
(45) Date of Patent: May 12, 2020

(54) DEVICE THROUGHPUT DETERMINATION

(71) Applicant: Hewlett Packard Enterprise Development LP, Houston, TX (US)

(72) Inventors: Uma Parthavi Moravapalle, Palo Alto, CA (US); Shruti Sanadhya, Palo Alto, CA (US); Abhinav Parate, Palo Alto, CA (US); Kyu-Han Kim, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/062,352

(22) PCT Filed: Oct. 2, 2015

(86) PCT No.: PCT/US2015/053701
§ 371 (c)(1),
(2) Date: Jun. 14, 2018

(87) PCT Pub. No.: WO2017/058247
PCT Pub. Date: Apr. 6, 2017

(65) Prior Publication Data
US 2018/0376348 A1    Dec. 27, 2018

(51) Int. Cl.
*H04W 16/22*     (2009.01)
*H04W 24/08*     (2009.01)
(Continued)

(52) U.S. Cl.
CPC ........... *H04W 16/22* (2013.01); *H04L 41/147* (2013.01); *H04W 24/08* (2013.01); *H04W 28/02* (2013.01); *H04W 28/18* (2013.01); *H04W 24/04* (2013.01)

(58) Field of Classification Search
CPC ..... H04W 16/22; H04W 24/08; H04W 28/02; H04W 28/18; H04W 24/04; H04L 41/147
See application file for complete search history.

(56) References Cited

U.S. PATENT DOCUMENTS

| 8,223,701 B2* | 7/2012 | Sashihara | H04W 28/26 370/230 |
| 2004/0009776 A1* | 1/2004 | Ishikawa | H04L 47/11 455/453 |

(Continued)

FOREIGN PATENT DOCUMENTS

| CN | 103987089 A | 8/2014 |
| EP | 1691562 | 8/2006 |

(Continued)

OTHER PUBLICATIONS

International Searching Authority, The International Search Report and the Written Opinion, dated Aug. 18, 2016, PCT/US2015/053701, 12 Pgs.

(Continued)

*Primary Examiner* — Ajay Cattungal
(74) *Attorney, Agent, or Firm* — Brooks, Cameron & Huebsch, PLLC

(57) ABSTRACT

In one example, a system for device throughput determination includes a monitor engine to monitor an average packet size at a node of a cellular network designated for a device and a channel quality between the device and the node of the cellular network, a classification engine to classify the device based on the monitored average packet size at the node designated for the device and the channel quality, a prediction engine to predict a throughput for the device over a quantity of future transmission time intervals (TTI) based on the classification of the device and a number of resources requested by the device over a period of time.

14 Claims, 4 Drawing Sheets

(51) Int. Cl.
*H04W 28/02* (2009.01)
*H04L 12/24* (2006.01)
*H04W 28/18* (2009.01)
*H04W 24/04* (2009.01)

(56) References Cited

U.S. PATENT DOCUMENTS

| | | | |
|---|---|---|---|
| 2007/0140167 | A1 | 6/2007 | Jang et al. |
| 2008/0192629 | A1* | 8/2008 | Chari ............... H04L 47/10 370/230 |
| 2009/0067328 | A1 | 3/2009 | Morris et al. |
| 2010/0091726 | A1 | 4/2010 | Ishii et al. |
| 2010/0144360 | A1* | 6/2010 | Okuda ............ H04W 72/042 455/450 |
| 2010/0150173 | A1* | 6/2010 | Yu .................. H04W 28/06 370/474 |
| 2012/0014251 | A1 | 1/2012 | Arnott et al. |
| 2013/0021933 | A1* | 1/2013 | Kovvali ........... H04W 88/18 370/252 |
| 2013/0044615 | A1* | 2/2013 | Carrera ........ H04W 72/1242 370/252 |
| 2013/0281089 | A1 | 10/2013 | Chandrasekhar et al. |
| 2014/0094186 | A1 | 4/2014 | Barberis et al. |
| 2014/0233420 | A1* | 8/2014 | Honda .............. H04L 65/605 370/252 |
| 2017/0280474 | A1* | 9/2017 | Vesterinen ........ H04W 28/22 |
| 2018/0132010 | A1* | 5/2018 | Fu .................. H04N 21/8456 |

FOREIGN PATENT DOCUMENTS

| | | |
|---|---|---|
| EP | 2549819 A1 | 1/2013 |
| WO | WO-2015/012653 A1 | 1/2015 |

OTHER PUBLICATIONS

Zhihang Li et al., "QoS and Channel State Aware Load Balancing in 3GPP LTE Multi-cell Networks," Science China Information Services, Apr. 2013, pp. 1-4, vol. 56, Issue 4.
"ip.access Small Cells", available online at <https://web.archive.org/web/20170104050349/https://www.ipaccess.com/en/Small-Cells>, Jan. 4, 2017, 1 page.
"SpiderCloud: Scalable Enterprise Small Cell System", available online at <https://web.archive.org/web/20180224224801/spidercloud.com/small-cell-ran>, Feb. 24, 2018, 5 pages.
3GPP, "The Mobile Broadband Standard", available online at < www.3gpp.org/>, Retrieved in 2019, 4 pages.
Aggarwal et al, "Prometheus: Toward quality-of-experience estimation for mobile apps from passive network measurements", Proceedings of the 15th Workshop on Mobile Computing Systems and Applications, Feb. 2014, 6 pages.
Chen et al., "Quantifying skype user satisfaction", Proceedings of the 2006 conference on Applications, technologies, architectures, and protocols for computer communications, Sep. 2006, pp. 399-410.
Christopher May, "What are the tangible benefits of adopting UC?", available online at <https://www.voss-solutions.com/news/blog/2014/Tangible-Benefits-of-Adopting-UC/>, Jul. 15, 2014, 8 pages.
Cisco, "Cisco Visual Networking Index: Global Mobile Data Traffic Forecast Update, 2015-2020", Feb. 3, 2016, 39 pages.
Cisco, "Indoor Small Cells: A Guide to Mission-Critical Communication", 1 page.
Commscope, "Maximum Your Indoor Potential—today and tomorrow—with C-RAN small cells", Retrieved in 2019, 6 pages.
Deng et al., "All your network are belong to us: A transport framework for mobile network selection", Proceedings of the 15th Workshop on Mobile Computing Systems and Applications, Feb. 2014, 6 pages.
Mahindra et al, "A practical traffic management system for integrated LTE-WIFI networks", Proceedings of the 20th annual international conference on Mobile computing and networking, 2014, pp. 189-200.
Nguyen et al, "Towards understanding tcp performance on lte/epc mobile networks", Proceedings of the 4th workshop on All things cellular: operations, applications, & challenges, 2014, 6 pages.
Ns-3, "What is ns-3?", 2011-2019, 2 pages.
Patro et al., "Observing home wireless experience through wifi aps", Proceedings of the 19th annual international conference on Mobile computing & networking, 2013, 12 pages.
Sesia et al., "LTE, The UMTS Long Term Evolution: From Theory to Practice", Wiley Publishing, 2009, 22 pages.
Ted schadler, "2013 Mobile Workforce Adoption Trends", Feb. 4, 2013, 11 pages.

* cited by examiner

DEVICE THROUGHPUT DETERMINATION

BACKGROUND

Devices can utilize a variety of network types to access data. Networks can include wireless communication networks such as W-Fi and/or cellular networks. The variety of network types can include advantages and disadvantages based on a type of application being used by the devices. For example, a Wi-Fi connection can provide relatively low delay and relatively high packet loss compared to a cellular network connection such as a long term evolution (LTE) cellular network. Devices can utilize a variety of different applications that use data from a network. In some cases, a performance of the application can be affected by the type of network being used by the device.

DETAILED DESCRIPTION

Figure 1:
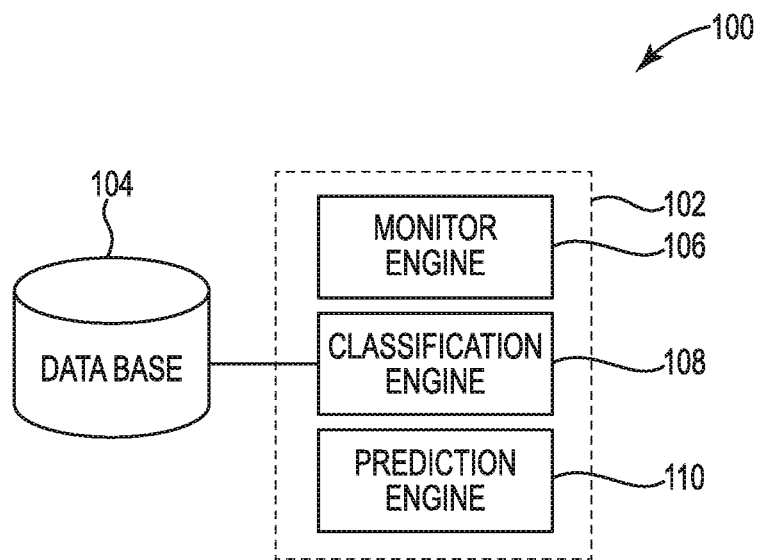
FIG. 1 illustrates a diagram of an example of a system for device throughput determination consistent with the present disclosure.

A number of methods, systems, and computer readable medium for device throughput determination are described herein. As used herein, a device throughput determination can include a per-user resource share of a cellular network. More specifically, the device throughput determination can include a per user LTE share of resources (PULSAR). The device throughput determination can utilize network state information in addition to application traffic patterns for each device that is communicating with a particular node (e.g., cellular tower node, eNodeB, etc.) to predict throughput for each device over a period of time (e.g., transmission time intervals (TTI), etc.). In some examples, the throughput determination can also predict throughput put for a number of devices expected to connect to the particular node at a future time.

The device throughput determination can include classifying each device based on a quantity of resources demanded by the device over a period of time, a channel quality (e.g., channel quality indicator (CQI), etc.), and/or packet arrival rate. For example, each device communicating with a particular node can be utilizing a particular type of application that uses a particular quantity of resources over the period of time. In this example, each device can be classified based on the quantity of resources that the type of application uses over the period of time. When each of the devices communicating with a particular node are classified, a sub-frame share can be calculated for each of the devices. As described further herein, the sub-frame share can be utilized to determine a maximum resource share for each of the devices as well as a predicted resource share when the average size of application packets arriving at the node for the device is less than a transport block size for the device.

The device throughput determination can utilize the sub-frame share to calculate a per-user resource share of a cellular network (e.g., PULSAR, etc.). In addition, as described further herein, the per-user resource share can be utilized to predict a future throughput for each of the devices utilizing a linear function. The device throughput determination for each of the devices can be utilized to: allocate network resources based on the per-user resource share, provide network admission control based on the per-user resource share, network selection based on the per-user resource share, determine network analytics based on the per-user resource share, and/or determine a status of a user based on the per-user resource share. In addition, the device throughput determination can be utilized to maintain a quality of experience (QoE) for end user devices that are utilizing a network and/or combination of networks.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Figure 2:
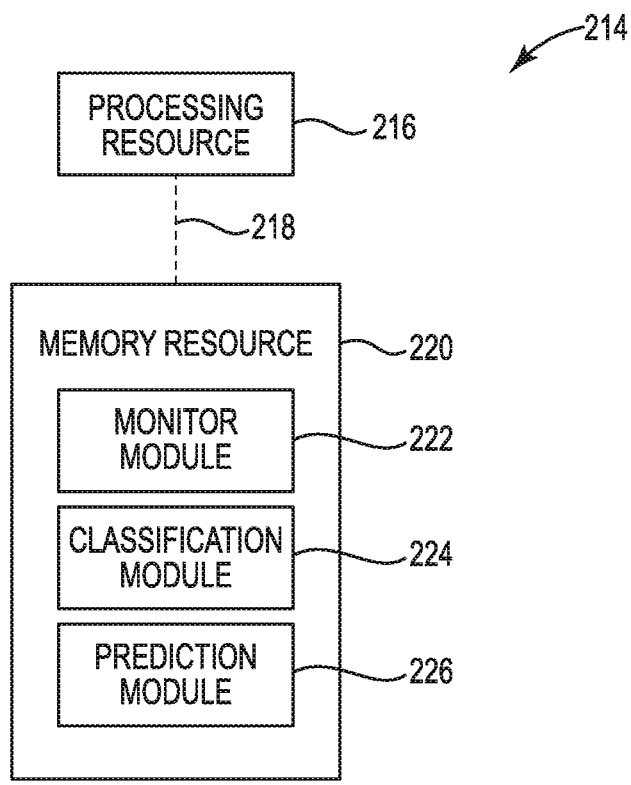
FIG. 2 illustrates a diagram of an example computing device for device throughput determination consistent with the present disclosure.

FIGS. 1 and 2 illustrate examples of system 100 and computing device 214 consistent with the present disclosure. FIG. 1 illustrates a diagram of an example of a system 100 for device throughput determination consistent with the present disclosure. The system 100 can include a database 104, a device throughput determination system 102, and/or a number of engines (e.g., monitor engine 106, classification engine 108, prediction engine 110). The device throughput determination system 102 can be in communication with the database 104 via a communication link, and can include the number of engines (e.g., monitor engine 106, classification engine 108, prediction engine 110). The device throughput determination system 102 can include additional or fewer engines than are illustrated to perform the various functions as will be described in further detail in connection with FIGS. 3-5.

The number of engines (e.g., monitor engine 106, classification engine 108, prediction engine 110) can include a combination of hardware and programming, but at least hardware, that is configured to perform functions described herein (e.g., monitor an average packet size at a node of a cellular network designated for a device and a channel quality between the device and the node of the cellular network, classify the device based on the monitored average packet size at the node designated for the device and the channel quality, predict a throughput for the device over a quantity of future transmission time intervals (TTI) based on the classification of the device and a number of resources requested by the device over a period of time, monitor the average packet arrival rate for each of the plurality of devices, etc.) stored in a memory resource (e.g., computer readable medium, machine readable medium, etc.) as well as hard-wired program (e.g., logic).

The monitor engine 106 can include hardware and/or a combination of hardware and programming, but at least hardware, to monitor an average packet size at a node of a cellular network designated for a device and a channel quality (e.g., strength of network connection, channel quality indicator (CQI), etc.) between the device and the node of the cellular network. In some examples, the monitor engine 106 can retrieve monitored data relating to the average packet size at a node of a cellular network that is designated to be sent to the device and a corresponding channel quality between the device and the node.

The monitor engine 106 can be utilized to determine a quantity of resources that are demanded or requested by the device over a period of time such as a TTI. For example, the monitor engine 106 can calculate the quantity of resources that are demanded or requested by the device via Equation 1.

$$X_i = arr_i \times n_i \qquad \text{Equation 1}$$

Within Equation 1 $X_i$ can represent a quantity of the resources demanded by a device (e.g., user equipment of user i ($UE_i$), etc.) per unit time. In addition, $arr_i$ can represent a quantity of packets arriving at the node for the device over a time period (e.g., one TTI, etc.). Furthermore, $n_i$ can represent a quantity of resources required to send one packet to the device. In some examples, $n_i$ can be calculated using Equation 2.

$$n_i = \lceil P_i / TBS_i \rceil \qquad \text{Equation 2}$$

Within Equation 2 $P_i$ can represent an average size of an application packet arriving at the node for the device. In addition, the $TBS_i$ can represent a transport block size (TBS) for the device (e.g., $UE_i$, etc.). For example, the TBS can be the number of bytes that can be sent in one TTI under a particular set of channel conditions (e.g., channel quality indicator (CQI), etc.). Thus, $n_i$ can be the smallest integer not less than $P_i/TBS_i$.

The classification engine 108 can include hardware and/or a combination of hardware and programming, but at least hardware, to classify the device based on the monitored average packet size at the node designated for the device and the channel quality. In some examples, the classification engine 108 can put each device of a plurality of devices that are associated with the node (e.g., devices currently communicating with the node, devices expected to communicate with the node at a future time, etc.) into one of two categories (e.g., Low Rate Category, High Rate Category, etc.). As used herein, devices that are associated with the node can include devices that are currently communicating with the node as well as devices that are expected to connect to the node at a future time.

In some examples, the classification engine 108 can compare the quantity of resources demanded (e.g., $X_i$ as referenced in Equation 1, etc.) to a threshold value. In some examples, the threshold value can be a value that represents an equal share of resources between each of the plurality of devices communicating with the node. For example, the threshold value can represent 1/k where k is quantity of devices communicating with the node. In this example, when there are a total of three devices communicating with the node, the threshold value can be represented by ⅓ where 3 is the quantity of devices communicating with the node. Thus, in some examples, the threshold value can be a value that represents an equal share of resources between the number of devices communicating with a particular network node.

The prediction engine 110 can include hardware and/or a combination of hardware and programming, but at least hardware, to predict a throughput for the device over a quantity of future transmission time intervals (TTI) based on the classification of the device and a number of resources requested by the device over a period of time. In some examples, the prediction engine 110 can calculate a sub-frame share based on the classification of each of the devices. The sub-frame share ($SF_i$) can be equal to the quantity of resources demanded by the device per TTI ($X_i$) when the device ($UE_i$) is classified as a low rate (LR) device (e.g., $X_i \leq 1/k$). When the device is classified as a high rate (HR) device (e.g., $X_i > 1/k$), the sub-frame share can be calculated utilizing Equation 3.

$$SF_i = \min(X_i, 1/|HR|(1 - \Sigma_{LR} X_i)) \qquad \text{Equation 3}$$

Within Equation 3 the |HR| can refer to a size of a particular set HR. In some examples, the prediction engine 110 can utilize the sub-frame share (SFi) to calculate a per-user resource share (e.g., PULSAR) utilizing Equation 4.

$$PULSAR = SF_i \times \min(TBS_i, P_i) \qquad \text{Equation 4}$$

In some examples, the prediction engine 110 can utilize the per-user resource share to calculate a predicted throughput ($Throughput_i$) for a particular device ($UE_i$). In some examples, the predicted throughput can be a linear function of the PULSAR. For example, the prediction engine 110 can utilize Equation 5 to calculate the predicted throughput for the particular device.

$$Throughput_i = C_1 \times PULSAR_i + C_0 \qquad \text{Equation 5}$$

Within Equation 5 $C_1$ and $C_0$ can represent constants that can be based on model fitting. In some examples, the $C_1$ and $C_0$ constants can be learnt over a period of time. For example, the $C_1$ and $C_0$ constants can be values that are representative of a plurality of generated models of similar cellular network interactions with a plurality of devices over a period of time. In some examples, there can be a $C_1$ and $C_0$ for devices that are classified as low rate and a different $C_1$ and $C_0$ for devices that are classified as high rate. That is, the $C_1$ and $C_0$ constants can be determined by generating models representative of devices that would qualify as low rate devices and generating models representative of devices that would qualify as high rate devices. As described herein, the per-user resource share (e.g., PULSAR) can be calculated for each device communicating with a network node. In addition, the throughput can be calculated for each device communicating with the network node.

The system 100 for device throughput determination can be utilized to predict throughput for a plurality of devices communicating with the same network node. In some examples, the system 100 can provide a better throughput prediction for devices that are using a variety of applications (e.g., running a variety of applications, executing a variety of applications, etc.) or data requests (e.g., voice over internet protocol (VoIP), video conference, desktop sharing, shared whiteboard, video streaming, bulk download, web browsing, etc.) compared to previous systems and methods. In addition, the system 100 can be utilized to provide a better throughput prediction for cellular networks such as 4G LTE and others. The system 100 can utilize the per-user resource share (e.g., PULSAR) and the throughput determination to provide better functionality for a number of network resources (e.g., admission control, network selection, performance analytics, etc.).

FIG. 2 illustrates a diagram of an example computing device 214 consistent with the present disclosure. The computing device 214 can utilize software, hardware, firmware, and/or logic to perform functions described herein.

The computing device 214 can be any combination of hardware and program instructions configured to share information. The hardware, for example, can include a processing resource 216 and/or a memory resource 220 (e.g., computer-readable medium (CRM), machine readable medium (MRM), database, etc.). A processing resource 216, as used herein, can include any number of processors capable of executing instructions stored by a memory resource 220. Processing resource 216 may be implemented in a single device or distributed across multiple devices. The program instructions (e.g., computer readable instructions (CRI)) can include instructions stored on the memory resource 220 and executable by the processing resource 216 to implement a function (e.g., assign a classification to each of a plurality of devices communicating with a node of a cellular network based on a quantity of resources demanded by each of the plurality of devices communicating with the node, determine a sub-frame share for each of the plurality of devices communicating with the node of the cellular network based on the classification assigned to each of the plurality of devices, calculate a predicted throughput for each of the plurality of devices based on a product of the sub-frame share and an average size of application packets arriving at the node for each of the plurality of devices, etc.).

The memory resource 220 can be in communication with a processing resource 216. A memory resource 220, as used herein, can include any number of memory components capable of storing instructions that can be executed by processing resource 216. Such memory resource 220 can be a non-transitory CRM or MRM. Memory resource 220 may be integrated in a single device or distributed across multiple devices. Further, memory resource 220 may be fully or partially integrated in the same device as processing resource 216 or it may be separate but accessible to that device and processing resource 216. Thus, it is noted that the computing device 214 may be implemented on a participant device, on a server device, on a collection of server devices, and/or a combination of the participant device and the server device.

The memory resource 220 can be in communication with the processing resource 216 via a communication link (e.g., a path) 218. The communication link 218 can be local or remote to a machine (e.g., a computing device) associated with the processing resource 216. Examples of a local communication link 218 can include an electronic bus internal to a machine (e.g., a computing device) where the memory resource 220 is one of volatile, non-volatile, fixed, and/or removable storage medium in communication with the processing resource 216 via the electronic bus.

A number of modules (e.g., monitor module 222, classification module 224, prediction module 226) can include CRI that when executed by the processing resource 216 can perform functions. The number of modules (e.g., monitor module 222, classification module 224, prediction module 226) can be sub-modules of other modules. For example, the monitor module 222 and the classification module 224 can be sub-modules and/or contained within the same computing device. In another example, the number of modules (e.g., monitor module 222, classification module 224, prediction module 226) can comprise individual modules at separate and distinct locations (e.g., CRM, etc.).

Each of the number of modules (e.g., monitor module 222, classification module 224, prediction module 226) can include instructions that when executed by the processing resource 216 can function as a corresponding engine as described herein. For example, the monitor module 222 can include instructions that when executed by the processing resource 216 can function as the monitor engine 106.

Figure 3:
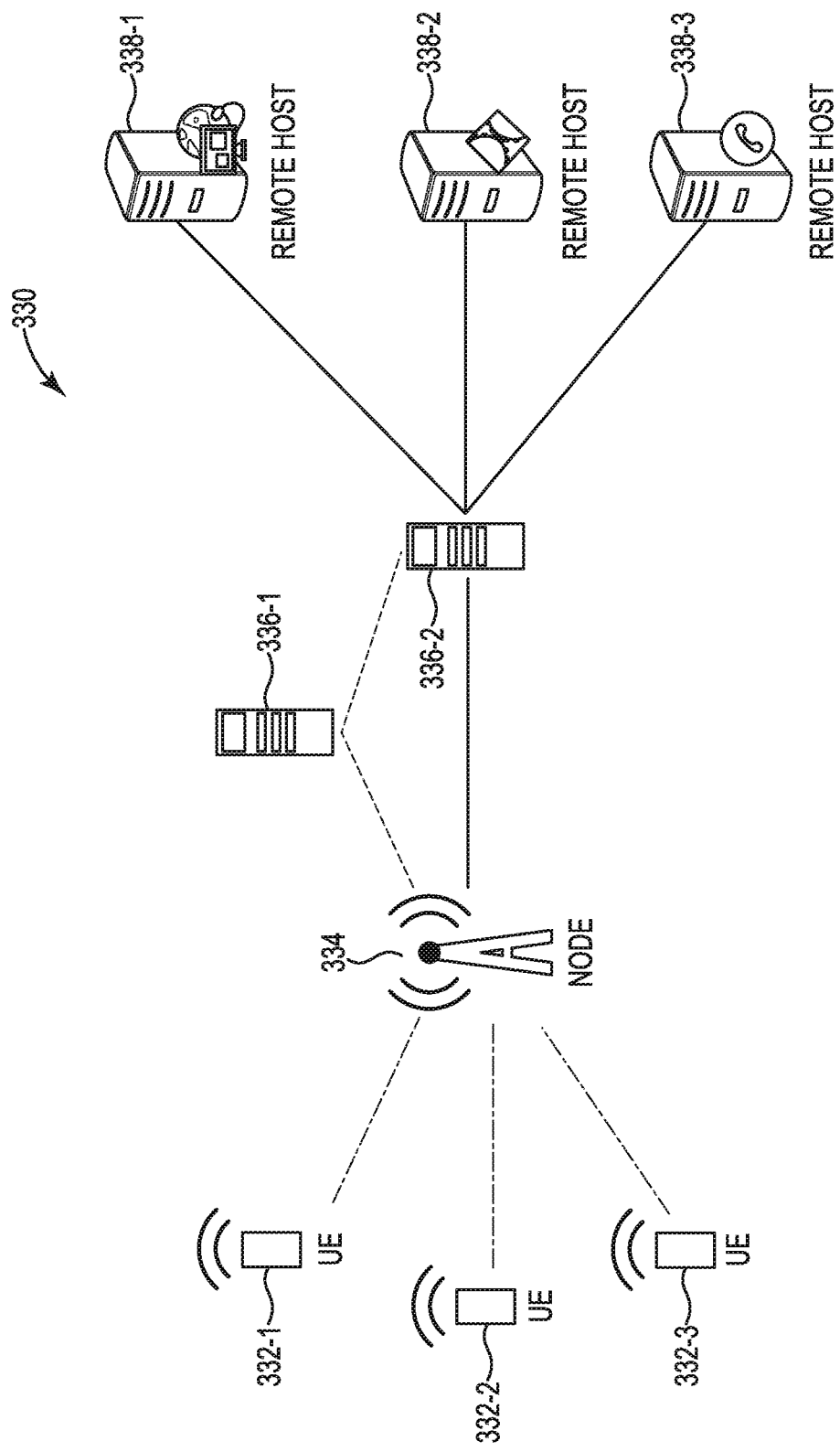
FIG. 3 illustrates a diagram of an example of a system for device throughput determination consistent with the present disclosure.

FIG. 3 illustrates a diagram of an example of a system 330 for device throughput determination consistent with the present disclosure. The system 330 can represent a cellular network such as a 4G LTE network. The system 330 can include a network node 334. The network node 334 can be a cellular network node (e.g., eNodeB, etc.).

The network node 334 can be coupled to a number of network components 336-1, 336-2. The number of network components can include, but are not limited to: a number of signaling gateways (SGW) between the network node 334 and a number of hosts 338-1, 338-2, 338-3, a number of packet data network gateways (PGW) between the network node 334 and a number of hosts 338-1, 338-2, 338-3, and/or a number of evolved packet core (EPC) devices between the network node 334 and a number of hosts 338-1, 338-2, 338-3.

The number of hosts 338-1, 338-2, 338-3 can include databases that can include information that can be requested or demanded by a number of devices (e.g., user equipment (UE), etc.) 332-1, 332-2, 332-3. In some examples, the number of devices 332-1, 332-2, 332-3 can share network resources in the last-hop access network such as a cellular network or W-Fi network. In some examples, the number of devices 332-1, 332-2, 332-3 can be performing a number of different requests (e.g., video streaming, etc.) and/or end-to-end communication (e.g., VoIP, etc.) to the number of hosts 338-1, 338-2, 338-3 through the network provided by the network node 334. For example, device 332-1 can be performing a video conference, device 332-2 can be performing a video streaming, and device 332-3 can be performing a bulk download. As described herein, in order to provide a greater quality of experience (QoE) for each of the number of devices 332-1, 332-2, 332-3, it can be important to determine a predicted throughput for each of the number of devices 332-1, 332-2, 332-3. Thus, a predicted throughput can be calculated utilizing Equations 1-5 as described herein.

In some examples, the predicted throughput can be calculated utilizing network side data. That is, in some examples, a system and/or computing device (e.g., system 100 as referenced in FIG. 1, computing device 214 as referenced in FIG. 2, etc.) can sit in the network (e.g., network node 334, etc.) and monitor LTE last-hop parameters to utilize when calculating the predicted throughput. In some examples, the monitored data from the network side (e.g., network node 334, network components 336-1, 336-2, remote hosts 338-1, 338-2, 338-3, etc.) of the system 330 can be the only data monitored to calculate the predicted throughput. That is, monitoring data on the device side (e.g., devices 332-1, 332-2, 332-3, etc.) of the system 330 may not be required for accurate device throughput predictions as described herein.

As described herein, each of the number of devices 332-1, 332-2, 332-3 can have a predicted throughput individually calculated based on packets monitored at the network node 334 that have a destination to a corresponding device of the number of devices 332-1, 332-2, 332-3. For example, device 332-1 can have a predicted throughput calculated specifically for the device 332-1 by monitoring packets at the network node 334 that are being transferred to the device 332-1 and utilizing the monitored packets (e.g., monitored size of packets, monitored average packet arrival rate, etc.) for each of the plurality of devices along with a network state (e.g., CQI, etc.) between the network node 334 and the device 332-1. In this example, the monitored packets and network state can be utilized as described herein with reference to Equations 1-5 to calculate a predicted throughput for the device 332-1. In addition, a similar example can be utilized for device 332-2 and/or device 332-3.

Figure 4:
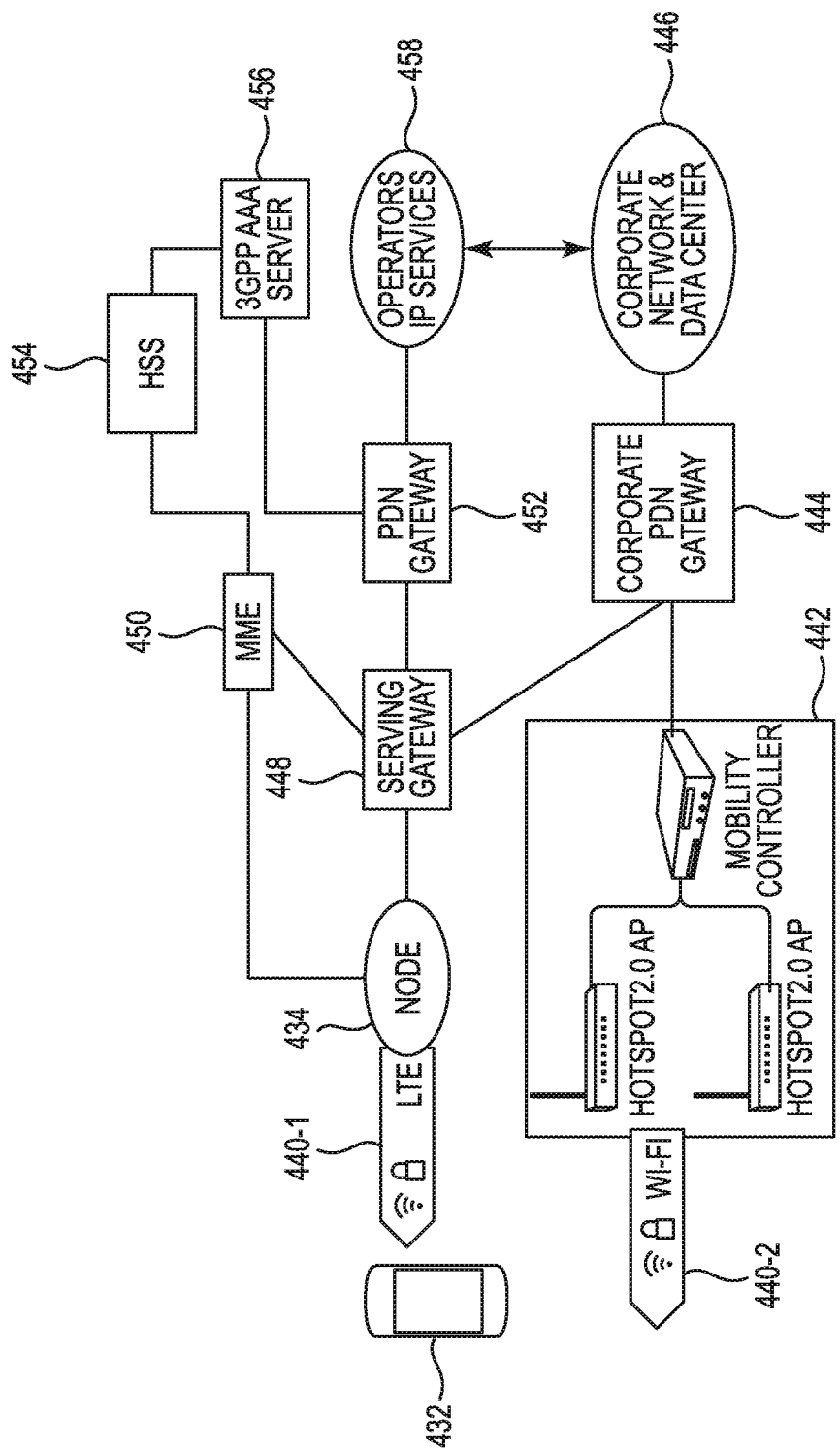
FIG. 4 illustrates a diagram of an example of a system for device throughput determination consistent with the present disclosure.

FIG. 4 illustrates a diagram of an example of a system 430 for device throughput determination consistent with the present disclosure. System 430 can include a similar cellular network connection 440-1 as system 330 as reference in FIG. 3 as well as a Wi-Fi connection 440-2. With the increasing capabilities of cellular networks to provide packet delivery within a building, a growing number of organizations are utilizing combination of Wi-Fi and cellular network to provide access to data for a number of users (e.g., employees, members, etc.). As described herein, there can be advantages and disadvantages with Wi-Fi networks and cellular networks. In some cases, it can be difficult to select one or the other for a particular device.

In some examples, the predicted throughput for a particular device can be utilized to determine if a Wi-Fi connection or a cellular connection would provide a greater quality of experience (QoE). For example, since a predicted throughput for a plurality of different devices can be calculated individually for each of the plurality of devices, the predicted throughput for a particular device can be utilized to determine whether a Wi-Fi connection 440-2 or a cellular network connection 440-1 would provide a greater QoE.

In some examples, the predicted throughput and a predicted QoE for the number of devices 432 in a specific location (e.g., room, hall, office, etc.) can be used to determine if the power (e.g., signal strength, etc.) of the network node 434 should be altered (e.g., increased, decreased, etc.) when the predicted throughput is below a particular threshold. In some examples, the predicted throughput over a relatively longer period of time (e.g., long term analysis, following year predicted throughput, etc.) can be utilized to determine if a capacity of the network (e.g., cellular network, Wi-Fi network, etc.) should be expanded by adding additional cellular nodes 434 and/or W-Fi access points (e.g., hotspots and controllers 442, etc.) for a particular location. In addition, the predicted throughput can be utilized determine whether an additional cellular node 434 or an additional W-Fi access point would provide a greater increase in QoE. Thus, the predicted throughput can be utilized for short-term or long-term network analytics and/or optimizing a network functionality for a particular area.

As described herein, a network state (e.g., CQI, etc.) and/or network connection between a device and a network node may not provide enough information for determining a greater QoE for a particular device. For example, the per-user throughput (e.g., PULSAR) can represent a network state as well as a number of resources demanded by the device over a period of time (e.g., TTI, etc.) to provide a better representation of predicted throughput for the device compared to previous methods.

The system 430 can represent a combination of Wi-Fi connection 440-2 and cellular network connection 440-1 that can be utilized to provide a number of devices 432 with a data connection. In some examples, the number of devices 432 can have a number of network options for requesting data. For example, a first network option can include a W-Fi connection 440-2 with a number of components for providing a W-Fi connection 440-2 to the number of devices 432. In this example, Wi-Fi connection 440-2 can include a number of hotspots and controllers 442 for providing a Wi-Fi signal to the number of devices 432. In addition, the Wi-Fi connection 440-2 can include a PDN gateway 444, a corporate network and data center 446, and/or operator's IP services 458 to provide the Wi-Fi connection 440-2 to the number of devices 432.

The system 430 can also include a second network option such as a cellular network connection 440-1 such as 4G LTE.

As described herein, the cellular network 440-1 can include a network node 434 (e.g., network node 343 as referenced in FIG. 3, etc.) that provides access to the cellular network connection 440-1. In addition, the network node 434 can be coupled to a number of supporting devices. For example, the number of supporting devices can include, but are not limited to: a serving gateway 448, a PDN gateway 452, a mobility management entity (MME) 450, a home subscriber server (HSS) 454, a 3GPP AAA server and/or an operator's IP services device 458 that is also coupled to the Wi-Fi connection 440-2.

As described herein, monitored data for each of the number of devices 432 can be monitored at the network side (e.g., network node 434, cellular network side, etc.) to determine a predicted throughput for each of the number of devices 432. In some examples, the predicted throughput for each of the number of devices 432 can be utilized to determine whether the cellular network connection 440-1 or the Wi-Fi connection 440-2 would provide a better QoE for each of the number of devices 432.

Figure 5:
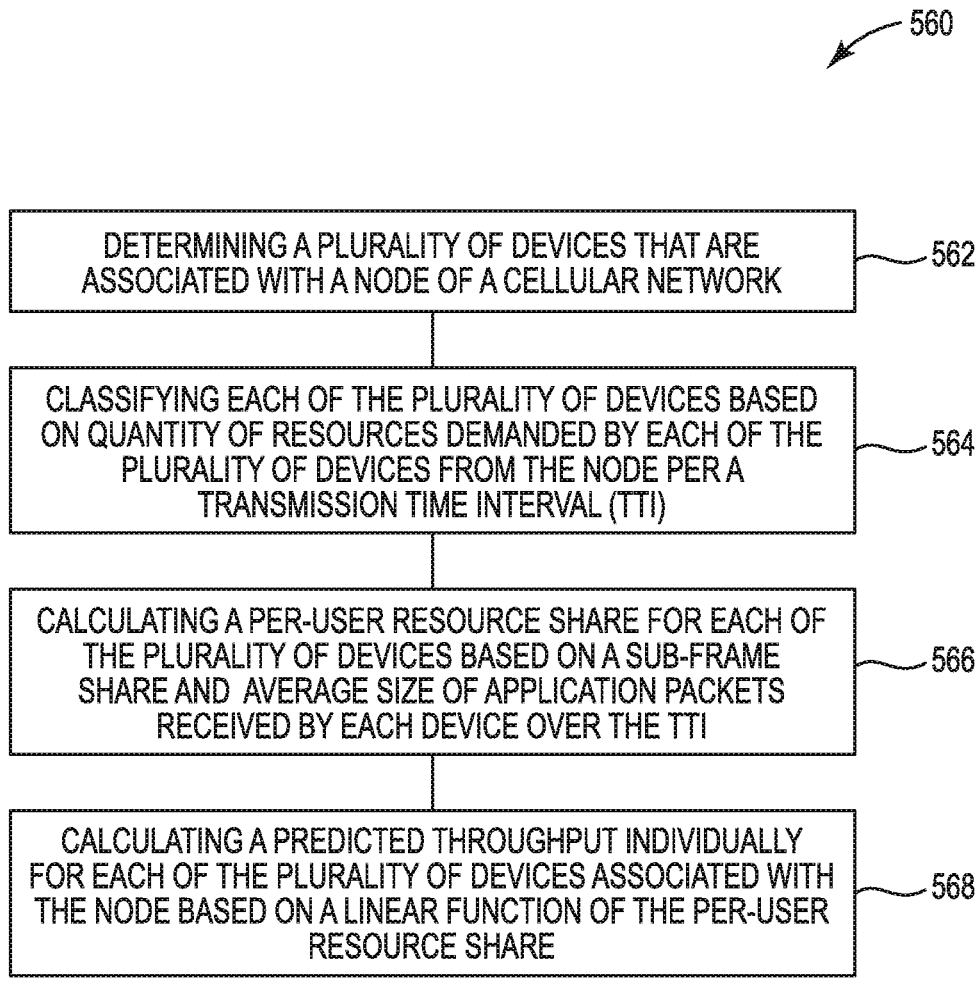
FIG. 5 illustrates a flow chart of an example of a method for device throughput determination consistent with the present disclosure.

FIG. 5 illustrates a flow chart of an example of a method 560 for device throughput determination consistent with the present disclosure. The method 560 can be executed by a system and/or computing device as described herein. For example, the method 560 can be executed by a system 100 as referenced in FIG. 1 and/or a computing device 214 as referenced in FIG. 2. As described herein in reference to FIG. 3 and FIG. 4, the monitored and/or determined data can be monitored and/or determined through processes on the network side compared to the device side.

At 562 the method 560 can include determining a plurality of devices that are associated with a node of a cellular network. As used herein, devices that are associated with the node can include devices that are currently communicating with the node as well as devices that are expected to connect to the node at a future time. Determining the plurality of devices that are associated with the node of the cellular network can include determining a number of devices that are receiving data packets from the node of the cellular network and a number of devices that are expected or predicted to receive data packets from the node of the cellular network in the future. When the plurality of devices are determined, each of the plurality of devices can be analyzed individually to determine a predicted throughput for each of the plurality of devices as described herein with reference to Equations 1-5.

At 564 the method 560 can include classifying each of the plurality of devices based on quantity of resources demanded by each of the plurality of devices from the node per a transmission time interval (TTI). As described herein, the each of the plurality of devices can be classified as a low rate device or a high rate device. In some examples, the number of resources demanded by the device over a period of time can be compared to a threshold value. In some examples, the threshold value can be equal to $1/k$, where $k$ is equal to the plurality of devices that are associated with the node of the cellular network. In some examples, when the number of resources demanded by a device is greater than $1/k$, the device is classified as a high rate device. In some examples, when the number of resources demanded by the device is less than or equal to $1/k$, the device is classified as a low rate device.

As described herein, the classification can be utilized to determine the sub-frame share as well as for determining a number of constants when calculating the predicted throughput. In some examples, the classification can be utilized to determine when there are a number of devices that have a different portion of resources. That is, the classification can be utilized to determine when resources are not allocated evenly between each of the plurality of devices.

At 566 the method 560 can include calculating a per-user resource share for each of the plurality of devices based on a sub-frame share and average size of application packets received by each device over the TTI. As described herein, the per-user resource share can be a per user LTE share of resources (PULSAR). In some examples, the per-user resource share can be calculating using Equations 1-4 as described herein.

At 568 the method 560 can include calculating a predicted throughput individually for each of the plurality of devices associated with the node based on a linear function of the per-user resource share. As described herein, the predicted throughput can be calculated individually for each of the plurality of devices utilizing at least Equation 5 described herein. In some examples, devices that are associated with the node can be user equipment devices such as mobile devices that are communicating with a node (e.g., cellular network node, etc.).

The method 560 can be utilized to calculate a per-user resource share (e.g., PULSAR). The per-user resource share can be a value that represents a more accurate quantity of resources being provided to an individual device as well as a more accurate representation of QoE. The per-user resource share can be utilized to execute a number of different network functions as described herein.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor. Further, as used herein, "a" or "a number of" something can refer to one or more such things. For example, "a number of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

What is claimed:

1. A system for device throughput determination, comprising:
    a monitor engine to monitor an average packet size at a node of a cellular network designated for a device and a channel quality between the device and the node of the cellular network;
    a classification engine to classify the device based on the monitored average packet size at the node designated for the device and the channel quality; and
    a prediction engine to predict a throughput for the device over a quantity of future transmission time intervals (TTI) based on the classification of the device and a number of resources requested by the device over a period of time; and
    wherein the number of resources requested by the device is calculated based on a quotient of the average packet size at the node of the cellular network designated for the device and a transport block size.

2. The system of claim 1, wherein the classification engine compares the number of resources requested by the device to a threshold value to classify the device.

3. The system of claim 1, wherein the classification engine determines the transport block size for the device for the TTI under the monitored channel quality.

4. The system of claim 1, wherein the prediction engine utilizes a linear function of a product of sub-frame share for the device and the monitored average packet size at the node of the cellular network designated for the device to predict the throughput for the device over the quantity of future TTIs.

5. The system of claim 1, wherein the monitor engine determines a quantity of packets arriving at the node of the cellular network designated for the device in a single TTI.

6. The system of claim 1, wherein the monitor engine monitors the channel quality between the device and the node of the cellular network for each TTI.

7. A non-transitory computer readable medium storing instructions executable by a processor for device throughput determination, wherein the instructions are executable to:
    assign a classification to each of a plurality of devices communicating with a node of a cellular network based on a quantity of resources demanded by each of the plurality of devices communicating with the node, wherein the quantity of resources demanded by each of the plurality of devices communicating with the node is calculated based on a quotient of an average size of application packets at the node of the cellular network designated for each of the plurality of devices and a transport block size;
    determine a sub-frame share for each of the plurality of devices communicating with the node of the cellular network based on the classification assigned to each of the plurality of devices; and
    calculate a predicted throughput for each of the plurality of devices based on a product of the sub-frame share and the average size of application packets arriving at the node for each of the plurality of devices.

8. The medium of claim 7, wherein the predicted throughput for each of the plurality of devices is calculated separately for each of the plurality of devices.

9. The medium of claim 7, comprising instructions executable to monitor the average packet arrival rate for each of the plurality of devices and the average packet size of application packets arriving at the node for each of the plurality of devices.

10. The medium of claim 7, wherein the predicted throughput is calculated with a linear function of a product of the sub-frame share and the average size of application packets over a period of time.

11. A method for device throughput determination, comprising:
    determining a plurality of devices that are associated with a node of a cellular network;
    classifying each of the plurality of devices based on a quantity of resources demanded by each of the plurality of devices from the node per a transmission time interval (TTI), wherein the quantity of resources demanded by each of the plurality of devices from the node is calculated based on a quotient of an average size of application packets at the node of the cellular network designated for each of the plurality of devices and a transport block size;
    calculating a per-user resource share for each of the plurality of devices based on a sub-frame share and the average size of application packets received by each device over the TTI; and calculating a predicted throughput individually for each of the plurality of devices associated with the node based on a linear function of the per-user resource share.

12. The method of claim 11, wherein the quantity of resources demanded by one of the plurality of devices is less than the transport block size assigned to the one of the plurality of devices.

13. The method of claim 11, comprising determining an application type utilized by each of the plurality of devices.

14. The method of claim 13, wherein determining the application type includes determining the average size of application packets received by each device over the period of time based on the determined application type.

* * * * *